United States Patent [19]

Poppe

[11] 4,194,255
[45] Mar. 25, 1980

[54] FOAM SPRING

[76] Inventor: Willy Poppe, Heimolenstraat 147, 2700 Sint-Niklaas, Belgium

[21] Appl. No.: 949,063

[22] Filed: Oct. 6, 1978

[51] Int. Cl.² ............................................. A47C 27/08
[52] U.S. Cl. .......................................... 5/481; 5/477
[58] Field of Search ............... 5/248, 256, 345 R, 353, 5/359, 361 B, 420, 434, 468, 477, 481

[56] References Cited

U.S. PATENT DOCUMENTS

| 1,296,359 | 4/1919 | Brown | 5/368 |
| 2,539,058 | 1/1951 | Burns | 5/353 |
| 3,401,411 | 9/1968 | Morrison | 5/355 |
| 4,020,511 | 5/1977 | Terry | 5/361 B |
| 4,070,719 | 1/1978 | Morgan | 5/361 B |

FOREIGN PATENT DOCUMENTS 1185822  8/1959  France ......................................... 5/340

*Primary Examiner*—Casmir A. Nunberg
*Attorney, Agent, or Firm*—Bacon & Thomas

[57] ABSTRACT

Elastic springy element, characterized by the fact that it consists of a mainly tubular body, made of synthetic foam material or the like, whereby the wall of the body displays a number of hollows, in staggered symmetry the cross-sectional surface of which varies from practically zero at the inner wall of the body, to a maximum value at the outer wall, for an unloaded body.

14 Claims, 8 Drawing Figures

FOAM SPRING

The present invention pertains to a new type of spring or springy element, made of synthetic foam material or the like, which can for instance be used as element for building up armchairs, mattresses cushions and the like.

As is mentioned further on, a spring or springy element according to the invention can however in certain cases and providing the dimensions are properly chosen, be applied with advantage as a shock absorber or suchlike.

It has become current practice for the fabrication of mattresses for instance, to replace the conventional helical springs by elements such as uniform layers of synthetic foam material or by loose particles of such foam. The degree of springing capacity of such elements appears however not to come up to the required standards for optimum comfort.

It does indeed so happen, that according to the type of construction element, such mattresses appear to be too hard or too soft, which from an orthopaedic point of view cannot be justified. A good mattress spring must indeed be somewhat compressible, but must also retain a sufficient rigidity to be able at all times to afford the optimum required support to the part of the body resting thereon.

Attempts have already been made to solve this problem by presenting a mattress core consisting of a layer of synthetic foam material which is bored through vertically in certain specific locations. Next, this layer was stretched in a plane which is perpendicular to the imaginary axes of the bored holes and secured in stretched condition upon appropriate support layers.

A mattress core was thus obtained which offered the aspect of a honeycomb, whereby the imaginary axes of the bored holes were located in the direction of comprepression. In practice however, these building up elements did not satisfy the above-mentioned requirements of maximum comfort.

A markedly better type of mattress has already been presented in Belgian Pat. No. 853.293. Here namely, a synthetic foam material mattress is described of the type consisting of a partially hollow core, enclosed between two layers of synthetic foam material, characterized by the fact that aforesaid core is made up of a series of individual and regularly spaced small bars of polyurethane foam, having a density of at least 50 kg/m$^3$ and whereby these small bars are bonded at both ends to two layers of polyurethane foam of the same density.

The purpose of the present invention is to offer a more efficient solution to the above-stated problem by presenting a new type of spring or springy element, which can, amongst others, ideally be used as a construction element for mattresses.

A spring according to the invention is characterized by the fact that it mainly consists of a tubular body with a well determined wall thickness, made of synthetic foam material or the like, such as for instance polyurethane foam, whereby the wall of the tubular element is provided with hollows or perforations in staggered arrangement and the cross-sectional areas of which varies from practically zero at the inner wall of the tubular body to a maximum value at the outer wall, for an unloaded body. The above-mentioned hollows or perforations shall preferably have a diamond-shaped cross-section, and moreover in such a manner that the greater diagonal of each of afore-mentioned diamonds is directed along to the circumscribing generatrix of the outer wall of the tubular springy body. The present invention also pertains to the process of obtaining a spring of the above-mentioned type.

It consists in providing a layer or a block of synthetic foam material, having well determined dimensions, with a series of intermittent incisions according to a staggered arrangement, after which the perforated or incised block thus obtained is bent around in such a manner that its end surfaces come to be parallel and opposite to each other. By the bonding together of the two aforesaid end surfaces, an independent tubular body is obtained which, due to the bending around, shows a series of diamond-shaped hollows or perforations in its outer wall which are in staggered arrangement, whereas the inner wall hardly shows any sign of the above-mentioned incisions.

The applicant has discovered that such a body shows astonishing springy properties in the direction of its imaginary longitudinal axis. Investigations have shown that these astonishing characteristics can be explained by the combination of operations to which the original piece of synthetic foam material has been subjected, and not least of all by the characteristic shaping of the thus perforated material and by the internal stresses which are a consequence thereof.

A spring of polyurethane foam according to the invention has been subjected in the investigation department of the applicant to the classical load tests and appears to have perfectly satisfied the previously mentioned requirements. It was further observed, after a continuous series of one hundred thousand complete compressions in longitudinal direction, that the spring had lost less than 3% of its original length, which may indeed be considered as a most remarkable result for this sort of initial material.

The invention also comprises the process by means of which it is possible to fabricate a solid or continuous series of spring elements in such a manner that at least two incised layers of synthetic foam material are placed in sine wave form over each other, and are offset in such a way with respect to each other that a maximum of one layer locates opposite a minimum of the next layer, whereby both layers are bonded together at the level of these contact points.

The last mentioned process permits the fabrication of the spring elements according to the invention at a considerably greater rate, and to carry on the production as a continuous process.

In order to make the substance of the invention more comprehensible, a detailed description will be given hereinafter of an example of fabrication, without limiting the invention thereto, and with reference to the appended drawings in which.

A block of synthetic foam material 1, preferably polyurethane foam, of well determined dimensions, is provided over its entire length with intermittent incisions 2, which extend through the total thickness of block 1 and are preferably aligned according to a staggered design. The dimensions of block 1 may be chosen at will, in accordance with the desired dimensions of the spring to be fabricated, although it is quite obvious that for each type of spring maximum and minimum values are imposed, resulting from the physical properties of the initial material.

Figure 1:
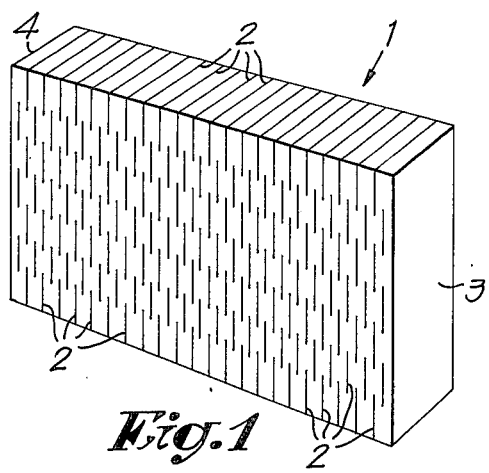
FIG. 1 shows an incised block in unstretched condition.
Figure 2:
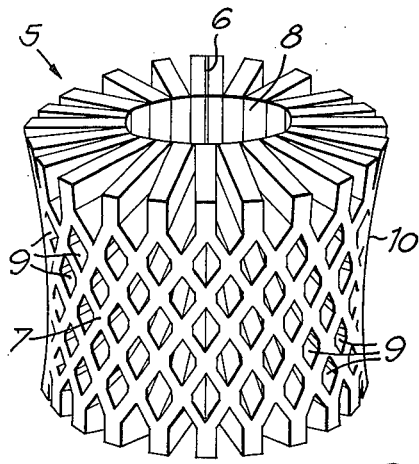
FIG. 2 shows a tubular spring element according to the invention, in perspective view.

Block 1 is then bent around in such a manner that its end surfaces 3 and 4 are adjacent each other so that a tubular element 5, as illustrated in FIG. 2, is obtained. Surfaces 3 and 4 of block 1 are then bonded together over their total area, preferably by means of a layer of appropriate glue 6, so that an independently existing tubular element 5 is formed. Due to the bending around of block 1, the slots of the incisions 2 are stretched and compressed, according to wether they are located along the outer or inner wall, respectively 7 or 8, of element 5.

Figure 5:
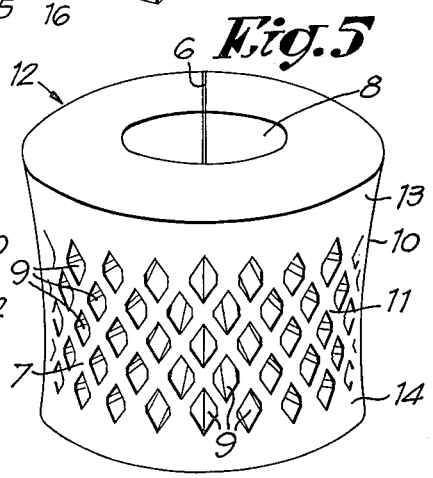
FIG. 5 shows an alternative form of embodiment of a spring according to the invention.

Element 5 consequently displays a series of diamond-shaped openings or hollows 9 in its outer wall 7, which are located according to a staggered design. Diamonds 9 are oriented in such a manner that their largest diagonal is directed according to the circumscribing generatrix 10 of outer wall 7 of element 5. As a result of internal stresses in the material, the area of each diamond-shaped cross-section diminishes from a maximum value at the outer wall 7 to practically zero at the inner wall 8, or in other words, the small diagonal of each of the diamond-shaped hollows decreases from outside to inside from a maximum value to almost zero. The density of the material of the tubular element is in consequence gradually reduced from the inner wall 8 towards the outer wall 7. This radial density gradient and the internal stresses in body 5 are the basic elements of the specific spring properties in longitudinal direction of spring 5. It is perfectly obvious that a tubular body, such as spring 5, made of pure polyurethane and provided with radial hollows of constant diameter, would display fundamentally different spring properties from the spring according to the invention. In certain cases however, and for certain applications, it may be desire to provide springs which only show the specific design of hollows of spring 5 over part of their surface. Such a spring is illustrated as an alternative form in FIG. 5. It will be noticed that the central part 11 of this spring 12 has the same structural design as that of spring 5 and that the top and bottom parts thereof, 13 and 14, are made of nonincised polyurethane foam. It is quite obvious that it is also possible to obtain only one, or more than two of such nonincised strips of polyurethane foam in the spring, according to the design of the incisions made in the initial block 1.

Figure 3:
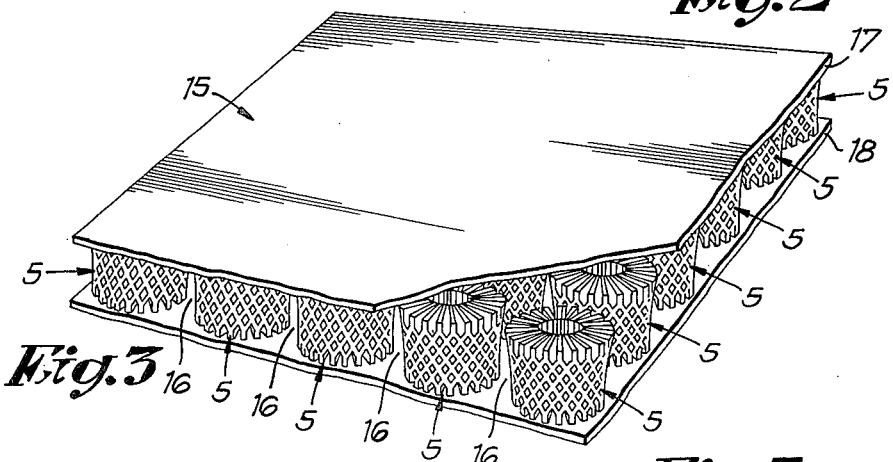
FIG. 3 is a perspective illustration of a continuous series of tubular elements according to the invention.

FIG. 3 illustrates an example of application in the shape of a mattress or the like 15, consisting of a series of springs according to the invention, which are aligned parallel to each other, thereby observing the necessary free space 16 around them, so as to permit the unrestrained expansion thereof. When this space 16 is of too small dimensions, the mattress will offer a greater resistance than in the case where on the contrary this space has been selected too large.

It is obvious that when a mattress is being fabricated with this type of construction element, the last named parameter must be taken into consideration. The series of upright individual springs 5 in mattress 15 are mutually maintained together by means of two appropriate support layers or carrying membranes, 17 and 18, which are attached respectively to the upper and to the lower ends of each spring 5, for instance by gluing. The nature and the thickness of support layers 17 and 18 may be chosen at will (nylon, jersey, polyurethane, etc . . . ).

Figure 4:
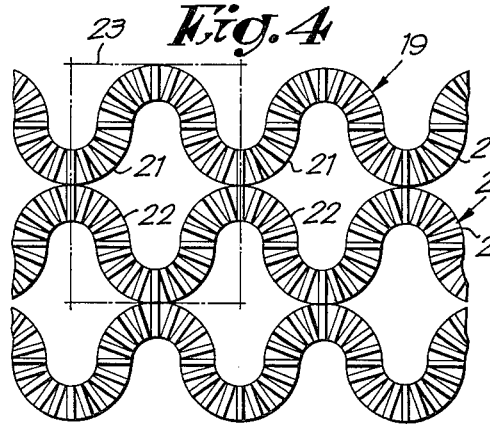
FIG. 4 shows a horizontal section of a matress or the like, built up with sine wave shaped springs according to the invention.

According to the invention, and is shown in FIG. 4 an appropriate mattress core can also be obtained by at least two blocks or layers of incised synthetic foam material, 19 and 20, to be individually formed in sine wave shape and in longitidinally stretched condition, whereby they are layed over each other in this condition in offset arrangement, so that the minima 21 of the first layer 19 are located above the maxima 22 of the second layer, both layers being secured together at these contact areas by means for instance of an appropriate glue. A contiguous and continuous series of tubular elements 23 is obtained in this manner, which can for instance be used as a monolitic construction element for a mattress. This latter process moreover offers the possibility of a continuous production of a large number of springs or of monolitic spring elements, which will of course favourably influence the cost price of the finished product.

Figure 6:
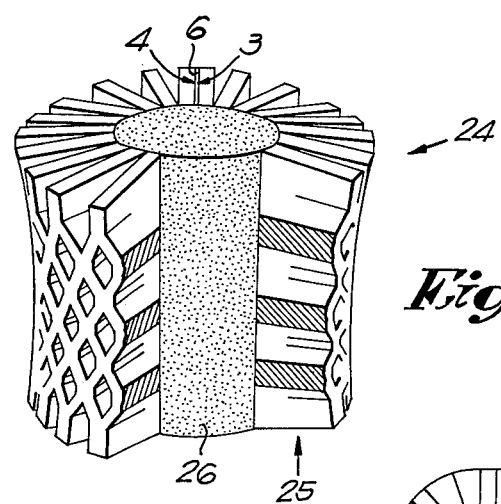
FIG. 6 illustrates a further form of embodiment of a foam spring according to the invention, partially cut away.
Figure 7:
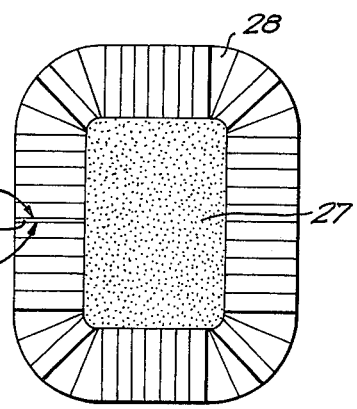
FIG. 7 shows a top view of an alternative to the embodiment of FIG. 6.

In order to promote the degree of elasticity as well as the dimensional stability, foam springs according to the invention may be provided with cores or core elements, as illustrated in FIGS. 6 and 7.

A foam spring 24 according to this form of embodiment mainly consists of a jacket 25 of synthetic foam material and of a core 26. In fact, the jacket 25 shall itself preferably be a foam spring like those illustrated in FIGS. 1 to 5. The core 26 has a diameter which mainly corresponds with the inner diameter of jacket 25 and shall preferably consist of a synthetic foam material having the same density as the one of which jacket 25 is made up, although certain advantages may be derived from using some other material for the core. According to the desired degree of elasticity, core 26 may be of the same length as jacket 25, or may consist of several partial cores of smaller length, whereby the latter may possibly be made of some different material and whereby one or more free spaces can be left between aforesaid partial cores.

Essentially, foam spring 24 can be manufactured by bending a jacket 25, initially consisting of a block of synthetic foam material, preferably polyurethane, of well determined dimensions and provided with intermittent incisions extending right through the thickness of aforesaid block and which are preferably in staggered arrangement, around a core 26, consisting for instance also of polyurethane foam, whereby the end surfaces, 3 and 4, of aforesaid jacket 25 come to be located opposite each other and are bonded together over their entire length, preferably by means of a layer 6 of appropriate glue. A layer of glue could possibly also be provided between core 26 and jacket 25, although this is not an essential requirement. In order to be able to influence the degree of elasticity of the final product, core 26 or the partial cores may be made of some material with lower or higher density than that of jacket 25, or core 26 or the partial cores may display a well determined design of incisions and/or hollows.

The invention is however not exclusively limited to the above-described cylindrical foam springs, but also comprises foam springs consisting of a prismatic core 27 which is enclosed in a prismatic enveloping jacket 28 (FIG. 7). It is evident that in this case also several partial prismatic cores may be used.

Figure 8:
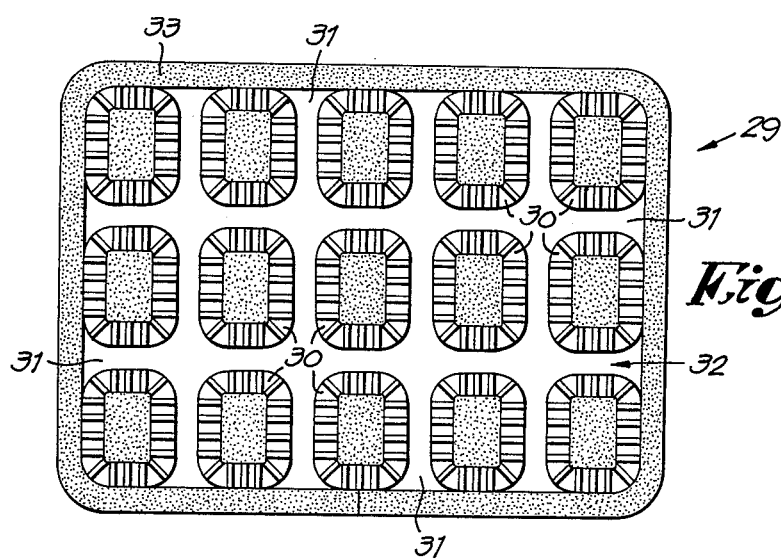
FIG. 8 shows a horizontal section of a pillow which is built up with foam springs as illustrated in FIG. 7.

In FIG. 8, an example of application is illustrated in the form of a pillow 29, which is built up from a series of prismatic foam springs 30 according to the invention, which are aligned side by side and parallel to each other, whilst heeding the required free space around them, and which are mutually held together by two appropriate support layers or carrying membranes, of which only the bottom one 32 is illustrated, and which are secured respectively to the top and the bottom sides of each spring 30, for instance by gluing. The assembly may further be surrounded by an encompassing layer 33 of synthetic foam material or of any other appropriate material.

It is perfectly obvious that the thickness and the nature of the support layers and of the outer jacket 33 may be chosen at will.

In the above, the invention has been described merely for illustration purposes in its application for the manufacture of mattresses and the like, although it is perfectly obvious that the invention can be used, with just as much success for any field of application in which importance is given to springs having the above-mentioned characteristics. A spring according to the invention might for instance be used as replacement for a classical metal spring under circumstances where corrosion considerably curtails the longevity of the latter. Providing a proper choice of dimensions, a spring according to the invention may be also in certain cases be successfully applied as shock absorber or the like.

It is perfectly obvious that the foregoing is merely an illustrating description of the invention without the slightest restrictive character and that numerous alterations or alternative forms of embodiment can be discovered without however going beyond the scope of the invention.

What I claim is:

1. Elastic spring element, comprising a tubular body of synthetic foam material or the like, the wall of the body having a plurality of hollows arranged in staggered symmetry through its tubular wall, the cross-sectional width of which varies from practically zero at the inner surface of the body to a maximum value at the outer surface, no load being applied.

2. Elastic springy element according to claim 1, characterized by the fact that the cross-section of each hollow at the outer wall is mainly diamond-shaped, whereby the large dimension of each afore-mentioned diamond-shaped hollow is directed along the circumscribing generatrix said outer wall.

3. Elastic springy element according to claim 1, characterized by the fact that the wall of aforesaid body is provided with said hollows over its entire surface.

4. Elastic springy element according to claim 1, characterized by the fact that the wall of aforesaid tubular body is provided with said hollows over at least a limited part of its surface.

5. Elastic springy element according to claim 1, characterized by the fact that the synthetic foam material is polyurethane.

6. Elastic springy element according to claim 1, characterized by the fact that at least one core of elastic springy material is fitted in aforesaid tubular body, and that its diameter substantially corresponds to the internal diameter of the tubular body.

7. Elastic springy element according to claim 6, characterized by the fact that afore-mentioned core is made of polyurethane foam.

8. Elastic springy element according to claim 6, characterized by the fact the the density of afore-mentioned core is substantially the same as the density of aforesaid tubular body.

9. Elastic springy element according to claim 6, characterized by the fact that the density of afore-mentioned core differs from that of aforesaid tubular body.

10. Elastic springy element according to claim 6, characterized by the fact that aforesaid core is provided with a series of hollows.

11. Elastic springy element according to claim 6, characterized by the fact that the length of aforesaid core is substantially equal to the length of afore-mentioned tubular body.

12. Elastic springy element according to claim 6, characterized by the fact that there are provided inside afore-mentioned tubular body two or more cores of elastic springy material, whereby the length of each of the cores is markedly smaller than the length of aforesaid tubular body and whereby free spaces are possibly left open between aforesaid smaller cores.

13. Elastic springy element according to claim 6, characterized by the fact that afore-mentioned smaller cores are made of some different material.

14. Lying, sitting or support element, characterized by the fact that it is made up of a number of elastic springy elements according to any one claims 1 to 13, and of which the end surfaces are mutually joined together by means of appropriate support layers to which afore-mentioned elements are individually secured at both of their ends.

* * * * *